July 27, 1926.
E. V. NOSER
1,593,843
LOCK FOR SHIFT LEVERS FOR AUTOMOBILES
Filed April 11, 1921
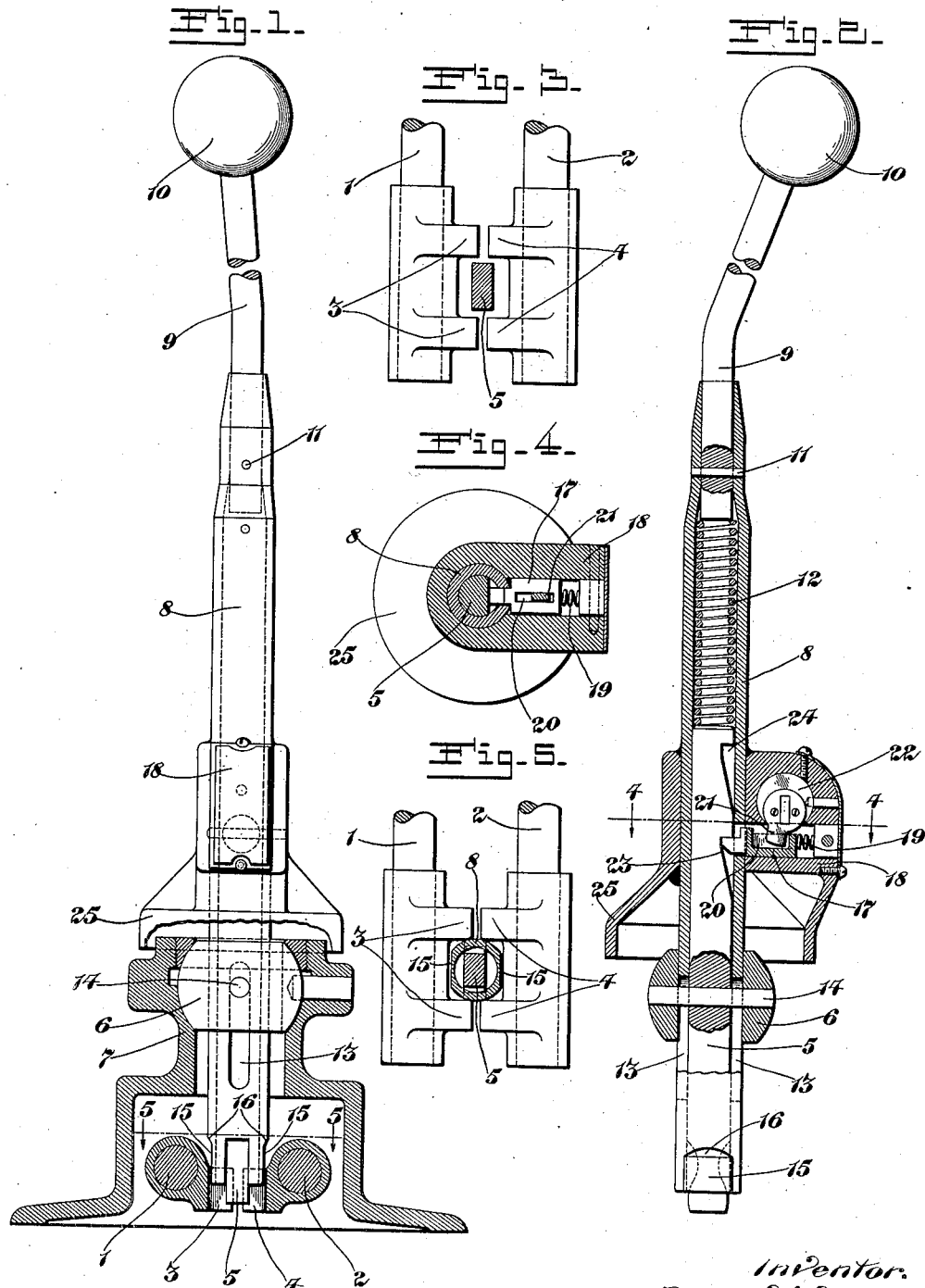

Patented July 27, 1926.

1,593,843

UNITED STATES PATENT OFFICE.

EMIL V. NOSER, OF ST. LOUIS, MISSOURI, ASSIGNOR TO NOSER INSTANT AUTO LOCK COMPANY, OF ST. LOUIS, MISSOURI, A CORPORATION OF MISSOURI.

LOCK FOR SHIFT LEVERS FOR AUTOMOBILES.

Application filed April 11, 1921. Serial No. 460,276.

This invention relates to locks for shift levers of automobiles.

An object of the invention is to provide an improved locking device for locking the shift lever of an automobile and which is of a stronger and more durable construction than devices usually employed for that purpose.

Another object of the invention is to provide a lock for locking the shift lever of an automobile embodying improvements herein described and claimed.

In the drawings:—

Fig. 1 is a view with parts in section and parts in elevation, showing features of the present invention.

Fig. 2 is a sectional view showing additional features of the invention.

Fig. 3 is a view showing the position of the shift lever between the arms of the two shiftable shafts.

Fig. 4 is a sectional view on the line 4—4 of Fig. 2, showing features of the locking device.

Fig. 5 is a sectional view on the line 5—5 of Fig. 1.

My present invention is an improvement upon the invention disclosed in my Patent No. 1,313,412, dated August 19, 1919. As shown, there are two shafts 1 and 2, each of which is shiftable axially in either direction, but which shafts in standard equipment are incapable of simultaneous axial movements. These shafts are connected with a control mechanism which is not shown, as a disclosure of such mechanism and the connection of said shaft therewith is not needed for present purposes. The shaft 1 supports two arms 3, and the shaft 2 supports two arms 4, which are similar to the arms 3. The arms 3 and 4 are rigid on the shafts 1 and 2 respectively, and extend toward each other so that when the two shafts are in idle or neutral position, the arms 3 are in alignment with the arms 4 respectively, as shown in Figs. 3 and 5.

My improved shift lever comprises a rod 5 extending through and having rigid connection with a ball pivot 6, mounted in a support 7 for turning movement in any direction; a tubular member 8 enclosing the rod 5 that extends through the ball 6; and an angular handle member 9 extending into the upper end of the tube 8 and having a handle 10 on its upper end. The upper end of the tube 8 is pressed upon the lower end of the handle rod 9, and said parts are further rigidly united by a pin 11 passing therethrough. A spring 12 of the expansion type is located within the tube 8. The lower end of the handle rod 9 constitutes an abutment for the upper end of the spring; and the upper end of the rod 5, which rod is not movable axially, constitutes an abutment for the lower end of the spring. The tube 8 extends through the ball 6 and is axially movable, being provided with slots 13 for the pin 14, by which the rod 5 is supported in connection with the ball. The pin 14 holds the rod 5 from axial movement, but due to the presence of the slots 13, does not prevent axial movement of the tube 8.

The lower end of the rod 5 is between the arms 3 and 4 and is capable of movement laterally to engage only the arms 3 or only the arms 4, as desired. Thus, when it is desired to shift the shaft 1, the shift lever is oscillated first to position in which the lower end of the rod 5 is out of engagement with the arms 4 and is located between the arms 3; after which the shift lever may be moved in another direction to shift the shaft 1 axially; and on the other hand, the shift lever is oscillated first to position in which the lower end of the rod 5 is out of engagement with the arms 3 and is between the arms 4, after which the shift lever may be operated to shift the shaft 2 without interference by the arms 3.

In the normal position the lower end of the tube 8 is above the arms 3 and 4, thus permitting the shift lever to be oscillated as described. When it is desired to lock the shift lever in inoperative or neutral position, the shafts 1 and 2 are adjusted in the positions shown in Fig. 5, after which the tube 8 is forced downwardly in opposition to the power of the spring 12 to a position in which the lower end of the tube 8 is between the arms 3 and 4 and a sufficient distance below the adjacent surfaces of the sleeves with which said arms are connected to prevent lateral movement of the shift lever. The lower end of the tube 8 is provided with flat surfaces 15, parallel with the adjacent walls or surfaces of the sleeves with which the arms 3 and 4 are united. The formation of the flat surfaces 15 reduces the diameter of the tube 8 to permit the lower end of the tube containing the flat surfaces to be inserted in locking position. As shown, the diameter of the tube 8 is greater than the space in which it is necessary to move the end of the tube, so that reduction in the diameter of the tube is required. The shoulders 16 above the flat surfaces 15 will serve to prevent the tube from becoming wedged in locking position should the parts become so disarranged as to permit the tube 8 to move that far.

The lock which I have provided as a part of the present invention is arranged substantially as shown. The lock bolt 17 is supported within a case 18 which is rigid with the tube 8. The lock bolt is operatively supported in an appropriate recess or housing in the lock case, and is pressed inwardly by a spring 19. The lock bolt is formed with a groove 20 to receive the end of a lever or arm 21, carried by the barrel 22 of the lock which is capable of manipulation by a key in the usual manner. The lock bolt 17 is arranged to engage with the rod 5 to lock the tube 8 in its above positions. The rod 5 is provided with a notch 23 which receives the end of the lock bolt 17 when the tube 8 is in its lower or locking position in which the lower end of the tube is located between the arms 3 and 4, as described and as shown in Fig. 1. Since it is necessary to raise the tube 8 to remove the lower end thereof from between the arms 3 and 4 before the shift lever can be manipulated, the lock bolt 17 must be disengaged from the notch 23 before the tube 8 can be moved axially. This requires the use of a key in the lock. When the lock is disengaged to permit upward movement of the tube 8, the tube will be automatically moved by the spring 12. Upward movement of the tube 8 will be limited by the slots 13 as well as by engagement of the lock bolt 17 in a notch 24 provided for that purpose. The notch 24 is below the lower end of the spring 12 so that it is impossible for the lock bolt to become engaged with the spring.

The tube 8 supports a cover 25 which contacts with the pivot support 7 when the shift lever is in locked position and thus prevents access to any of the parts cooperating with the pivot supporting the shift lever. This cover is an important feature of the invention. It affords ease of access to the parts when unlocked and prevents such access when locked. It prevents removal of the shift lever when locked, and renders removal easy when unlocked, thus affording great ease of assembling and disassembling. Thus I have provided a construction in which the cover 25 serves new and useful purposes. The entire shift lever device, including the cover, is readily and easily attached or detached.

The tube 8 and the housing for the lock, as well as the cover 25, are preferably casehardened or otherwise treated, so that they cannot be easily cut or broken.

What I claim and desire to secure by Letters Patent, is:—

1. A device of the character described comprising an axially shiftable shaft, a lever member for shifting said shaft axially, a support, a pivoted element mounted in the support for supporting the lever member, and a cover slidable on the lever member to cover the pivoted element and a part of the support to prevent access thereto when the lever is not in use.

2. A device of the character described comprising a lever member, a support, a pivoted element mounted in the support for supporting the lever member, a cover slidable on the lever member to position to cover the pivoted element and a part of the support to prevent access thereto when the lever member is not in use, and a lock for locking the cover with the lever member to hold the cover in position to prevent access to the pivoted element and the part of said support covered by said cover.

3. A device of the character described comprising a support, a pivoted element mounted in said support, an axially immovable rod carried by said pivoted element, a cover above and movable to position to prevent access to said pivoted element, and a lock for holding said cover in rigid relationship to said rod in position to prevent access to said pivoted element.

EMIL V. NOSER.